INVENTORS
REGINALD E. MEADE,
BY SHELDON I. GREENBERG

Ronald E. Lund
ATTORNEY

INVENTORS
REGINALD E. MEADE,
BY SHELDON I. GREENBERG

Ronald E. Lund
ATTORNEY

INVENTORS
REGINALD E. MEADE,
BY SHELDON I. GREENBERG

*Ronald E. Lund*
ATTORNEY

United States Patent Office 3,383,217
Patented May 14, 1968

3,383,217
PROCESS FOR PREPARING A CAKE MIX
AND THE RESULTING PRODUCT
Reginald E. Meade and Sheldon I. Greenberg, Minneapolis, Minn., assignors to The Pillsbury Company, Minneapolis, Minn., a corporation of Delaware
Filed June 5, 1964, Ser. No. 372,961
12 Claims. (Cl. 99—94)

ABSTRACT OF THE DISCLOSURE

Shortening-based free-flowing baking premix for blending with sugar and other baking mix ingredients comprising a multiplicity of small, discrete particles, each of which contains sugar, flour and emulsified shortening with each of said particles consisting essentially of a cluster of substantially ungelatinized flour-starch particles carried by a matrix comprising flour-protein and amorphous sugar.

This invention relates generally to novel dry farinaceous baking compositions and to methods of production and use of the same. More particularly, it relates to novel cake mixes and to methods of producing these mixes.

Although the invention is applicable to farinaceous baking compositions generally, investigations have revealed that when applied to shortening type cake mixes the invention provides highly unusual and unexpected results in terms of utilization of ingredients. For that reason the invention will be illustrated herein primarily by reference to such mixes.

Cake mixes in the dry form comprise flour, sugar, shortening, emulsifier (generally incorporated into the shortening), leavening, and flavors. Additives such as the water soluble salts of carboxymethylcellulose are sometimes incorporated to improve performance characteristics of the mix. In addition, dried eggs and dehydrated non-fat milk solids may also be incorporated, or alternatively may be left to be added in the liquid state by the user of the mix when a cake is prepared therefrom.

Flour, sugar, shortening, emulsifier, leavening and flavors may be considered the basic ingredients of a cake mix to which the user may add liquids and other added ingredients during preparation. During manufacturing of a cake mix it is sometimes desirable for the manufacturer to form a premix containing only part of the basic ingredients at certain stages of the production schedule. To the premix the balance of the basic ingredients are added to form the final cake mix. When used herein the terms "premix" and "cake mix" are used in that sense.

Cake mixes may be divided into two groups, namely shortening type mixes and non-shortening type mixes. The familiar white, yellow, and chocolate layer cake mixes are representative of the first group and angle food cake mixes are representative of the latter. Shortening-type cake mixes contain, as major ingredients, flour, sugar and shortening.

To the above-listed major constituents, other ingredients such as emulsifiers, starches, flavors, gums, egg solids, non-fat milk solids, and leavening agents may be added. Other additives known to those skilled in the art can also be used. The amounts, types, and selection of the particular components will vary depending on the type and flavor of mix desired.

In conventional baking mix manufacture, the desired ingredients are mixed in a dry state until the desired degree of uniformity and homogeneity is obtained. Shortening-containing mixes produced in this manner comprise discrete particles of shortening embedded with or in small discrete particles of the other components of the mix. In other words, on a microscopic scale heterogeneity is a characteristic of conventionally manufactured cake mixes. Moreover, a chraacteristic common of such conventionally-produced mixes is a propensity toward compaction into a coherent, dense mass upon application of even small pressures. Thus, when a small sample of such a mix is squeezed between the fingers, a dense, coherent mass will result which can be broken only by application of further force. This property interferes with the flow characteristics of the mix and makes difficult the handling and packaging of the product during manufacturing.

While such conventional cake mixes have enjoyed success in the past, there is room for improvement with respect to both the characteristics of the mix and methods for producing mixes. For example, cake mixes of the prior art, while convenient as regards time of mixing, require the addition of the prescribed liquid ingredients with, in most instances, blending at low speed during the initial stages followed by high speed mixing for times ranging up to four minutes. Any decrease in the mixing time or elimination of the blending step, without an accompanying decrease in quality, is a desirable goal.

Increased volumes of maked goods from a given weight of mix is another desirable goal. Although volumes produced by present day baking mixes are acceptable, an improvement in this property would be welcomed by both the housewife and the manufacturer. Improvements in the volume-weight relationship of cake mixes is particularly desirable.

The quality of cakes baked from a mix decreases if the housewife deviates from the recipe prescribed for that particular mix. Thus, housewives who deviate unduly from the prescribed optimum conditions of cake preparation experience failures which tend to reflect upon the mix and its manufacturer. For this reason, it is extremely important that baking mixes have the widest tolerance possible to deviations from optimum conditions. Present day mixes, particularly cake mixes, could be improved greatly in this regard.

With present day methods of mix manufacture which utilize dry blending, it is possible that insufficient blending will result and produce variations among individually packaged mixes, which variations will be reflected to the consumer as variations in the quality of a finished cake.

It is, therefore, the general object of the present invention to provide novel baking mixes having improved properties and a novel method of producing these mixes.

A further object of the invention is to provide novel baking mixes, particularly cake mixes, which will produce a finished product of given quality with less mixing during preparation than required for baking mixes of the prior art.

A further object is to provide baking mixes, particularly cake mixes, having increased tolerance to deviations from optimum prescribed directions for the preparation of goods baked from such mixes.

A still further object of the invention is to provide a cake mix capable of producing a cake having a greater volume from a given amount of mix than cake mixes of the prior art.

Other objects of the invention will be apparent from an examination of the following description of the invention and the accompanying drawings in which.

In accordance with the present invention the above objects are attained by producing a baking mix comprising the steps of (a) mixing at least a portion of the flour and at least a portion of at least one ingredient selected from the group consisting of sugar and shortening with water, or any other suitable aqueous liquid such as milk, in an amount sufficient to dissolve any sugar which may be present and provide a visco-elastic mass; and (b) dehydrating the resulting mixture to provide a dry free-flowing mix. Depending on the method of dehydration used, comminution of the dehydrated mix may or may not be necessary to yield a dry product which is free flowing. The other ingredients of the mix may be included in the process or added after the dehydration step is completed. In general it is desirable to add as many of the ingredients as possible to take full advantage of the present invention.

The term visco-elastic mass, as used herein, refers to any flour-containing system which is characterized to some degree by an elasticity and a viscosity higher than water. Specifically, the term includes both doughs and batters, both of which manifest both characteristics, the difference being that the former displays a much greater viscosity and elasticity than does the latter.

Figure 1:
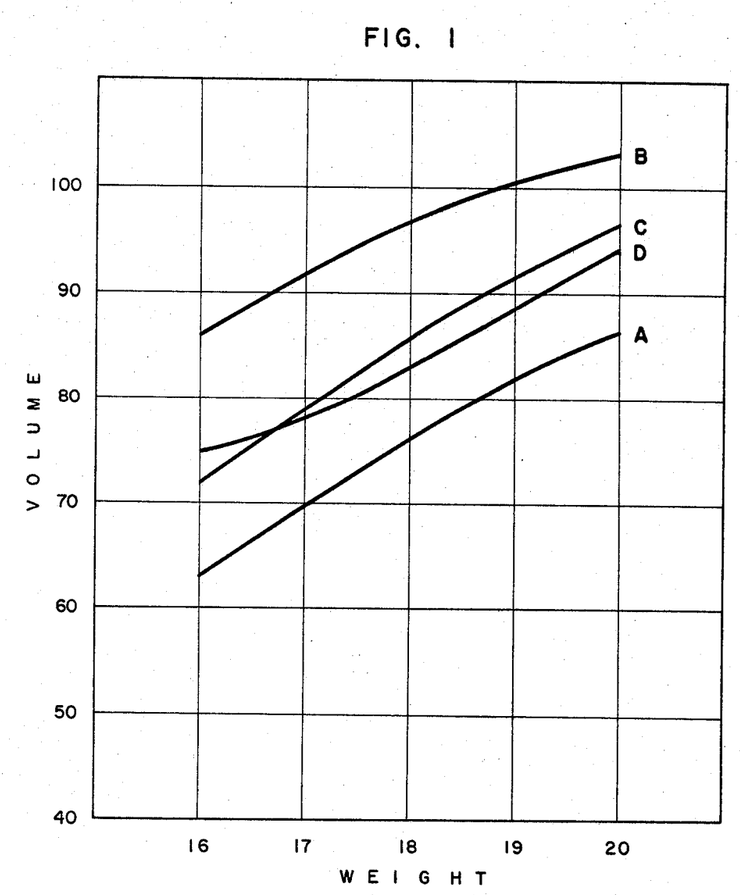
FIG. 1 is a graph showing cake volume as a function of amount of cake mix used.

Cake mixes produced in accordance with the present invention will yield baked cakes having a greater volume for a given amount of mix than cakes baked from mixes produced in the conventional manner. FIGURE 1 is a graph showing cake volume in arbitrary units on the ordinate as a function of the weight of dry mix used, in ounces, on the abscissa. Curve A represents the volume of cakes produced from conventional mixes containing emulsified shortening; Curve B represents the volume of mixes produced when the flour, sugar and emulsified shortening content of the mix is processed in accordance with the present invention; Curve C represents the volume of cakes baked from mixes in which the flour and sugar content of the mix has been processed in accordance with the present invention; and Curve D shows the relationship between volume and the amount of mix used for a mix in which the flour and emulsified shortening content thereof has been treated in accordance with the present invention. From an examination of FIGURE 1 it may be seen that the present invention provides a significant improvement in the volume performance of cake mixes.

While this surprising increase in volume performance is not fully understood, it is believed that the present invention orients the ingredients so that an oil-in-water emulsion is more easily formed when water is added to form a batter. If this hypothesis is valid, it is believed that the present invention places the cake mix ingredients in their most advantageous form for use in preparing a cake.

In addition, the cake mixes of the present invention are more tolerant to deviations from the prescribed water addition and baking temperature during cake preparation than are conventional mixes. This increased tolerance may be more fully described in connection with the illustrative examples set forth below.

When prepared in accordance with the present invention, cake mixes may be mixed into ready-to-bake batters in much shorter times than prior art mixes. In general, the mixing times of cake mixes of the present invention are 50% or less of the times required for most prior art mixes.

The flour used is preferably the flour normally used in the manufacture of the baking mix desired. Thus flours having low protein and ash contents are preferred for cake mixes. It may be noted, however, that the present invention enables one to use for cake mixes a flour of lesser quality and cost to give the same results in terms of cake mix performance than when conventional mix manufacturing techniques and higher quality flours are used. It is believed important for most mixes that gelatinization of the starch content of the flour be substantially avoided during processing, although it must be recognized as a practical matter that gelatinization to a minor degree necessarily occurs when starch is heated and processed in the presence of water.

Shortenings which are conventionally used in the manufacture of baking mixes are suitable for use in the present invention. They may be of animal or vegetable origin and may be either in the liquid or plastic state. As noted above, emulsifiers are commonly used as ingredients in the manufacture of conventional cake mixes. Although, as will be illustrated in examples below, the application of the present invention to cake mixes which do not utilize emulsifier systems will produce a more tolerant final cake mix and noticeable improvements in the volume of the baked cake, it is highly desirable that an emulsifier be incorporated into the ingredients which are processed in accordance with the invention. When emulsifiers are incorporated the improvements in performance afforded by the invention are much greater. Emulsifiers are commonly incorporated into the shortening and the resulting combination referred to as "emulsified shortening." In some instances herein, the term "emulsified shortening" is used. It is to be understood however that the emulsifier need not be carried by the shortening but may be incorporated into the visco-elastic mass as a separate ingredient. Any edible emulsifier or combination of emulsifiers, the effectiveness of which is not destroyed during processing, may be used. Examples of common emulsifiers are glycerol esters, such as glycerol monostearate, sorbitan esters, such as sorbitan monostearate, esters of other polyhydric alcohols, such as propylene glycol monostearate, polyoxyethylene sorbitan esters, such as polyoxyethylene sorbitan monostearate, certain derivatives of glycerol esters, such as acetylated glycerol monostearate, and natural emulifiers, such as phospholipids. A system comprising polyoxyethylene sorbitan monostearate, glycerol monostearate, propylene glycol monostearate and sorbitan monostearate is preferred.

The term sugar as used herein embraces sucrose, lactose and dextrose, all of which are commonly employed in the preparation of baking mixes, and all other equivalent substances, some of which may contain synthetic sweeteners.

Any leavening system capable of reacting during baking to release a gas and provide volume to a baked product such as a cake during baking may be used. Conventionally, sodium bicarbonate and one or more well-known leavening acids are used for this purpose. Since such mixtures, if incorporated into the visco-elastic mass produced and dried in accordance with the invention, would react at the conditions normally encountered during drying, it is preferable that the leavening system be blended into the mix after dehydration. It is, however, possible to dry one or more components of the leavening system separately with only a portion of the mix and to blend the separately dried portions, each of which contains one constituent of the leavening system, after dehydration. Any other technique for protecting the leavening system during processing, such as applying protective coatings, can also be used.

The other conventional ingredients of baking mixes such as flavors, eggs, milk solids and hydrophilic colloids may be added to the visco-elastic mass prior to drying or dry blended with the dried premix just prior to packaging. It should be apparent that egg solids and milk solids which are found in some mixes may be provided by incorporating fresh eggs and fresh milk into the batter prior to drying.

The mixing step before dehydration (step (a) above) must be conducted in such a manner that a homogeneous blend of all components results. When shortening is present it is necessary that a stable emulsion be formed in order to provide a homogeneous dispersion to avoid separation of fat and water during the drying step. In general it is preferred that mixing be conducted at elevated temperatures for two reasons. First, at elevated temperatures less liquid is required to dissolve any sugar which may be present, and secondly, if normally plastic shortening is used, elevated temperatures are normally required to form a stable emulsion. In general, it is desirable to conduct the mixing step at temperatures within the range of 80° F. to 140° F., although as noted above any temperature at which a homogeneous stable visco-elastic mass can be attained without damage to the product is satisfactory.

The drying step (step (b) above) may be suitably performed by any convenient dehydration process. Suitable processes include freeze drying, vacuum drying and spray drying, of which spray drying is preferred. Drying must be conducted at temperatures which will not result in damage to the product.

If the drying step yields a product which requires comminution to result in a free-flowing product, any convenient method of grinding may be employed. One suitable method is hammer milling.

Any of the ingredients which are not processed in accordance with the invention may be, as noted above, dry blended with the material resulting from the dehydration step. This blending can be accomplished by any blending technique.

As noted above, with respect to any cake mix formula, at least a portion of the flour content thereof and at least a portion of at least one ingredient selected from the group consisitng of shortening and sugar are necessary in the practice of the present invention. Thus in a formula consisting of four parts flour, four parts sugar, and one part shortening, two parts of the flour and two parts of the sugar may be processed in accordance with the invention to provide a premix which may then be dry-blended by conventional techniques with the balance of the formula and any other desired ingredients to provide the final mix.

To insure enjoyment of the full benefits of the present invention as applied to cake mixes, including the increase in volume, it is desirable that for each part of flour used to form a premix up to 2.5 parts of shortening and/or up to 20 parts of sugar be used. Preferably, a composition containing 30–70% flour, 10–70% sugar and 4–26% shortening, on a dry basis, are processed together. Such a premix can be used together with added flour, shortening, or sugar to form a blended mix.

As noted above any amount of water which will dissolve any sugar that may be present and provide a visco-elastic mass may be used. It is however preferred that the amount of water present in the visco-elastic mass be at least 25% and in the case of spray drying be at least 45%. For spray drying 55% water in the material to be dried is preferred.

Turning now to the products of the present invention, an understanding of the products and their form requires an understanding of the constituents of flour. Flour may be looked upon as a mixture of three fractions; namely (a) free starch granules (being generally spherical in shape and having a diameter within the range of 10 to 40 microns), (b) free protein particles having irregular shapes and sizes generally less than the starch granules, and (c) particles which are agglomerates of starch and protein (i.e. chunk particles of bound starch and protein), many of which are larger size than the free starch and protein particles. A characteristic of all of the products of the present invention is that substantially all of the starch is free from the protein. Under microscopic examination, the particles appear as cluster of starch particles held together with the other constituents (i.e., sugar, flour protein and shortening). When added to water, these clusters quickly disintegrate allowing very rapid dispersion of the starch granules into the dough or better being formed.

As noted above, any shortening, sugar, or other ingredients which may be present are associated with the protein content of the flour in a matrix which binds the starch granules into clusters.

The shortening content of the product is present in very small globules within the dry material. The product, as noted above, is free flowing and from outward appearances is "non-greasy." As a result, it does not compact into a coherent mass when subjected to normal pressures encountered in handling.

The sugar content of the present products is in the amorphous form because of the dissolution and drying steps involved in the process.

Figure 2:
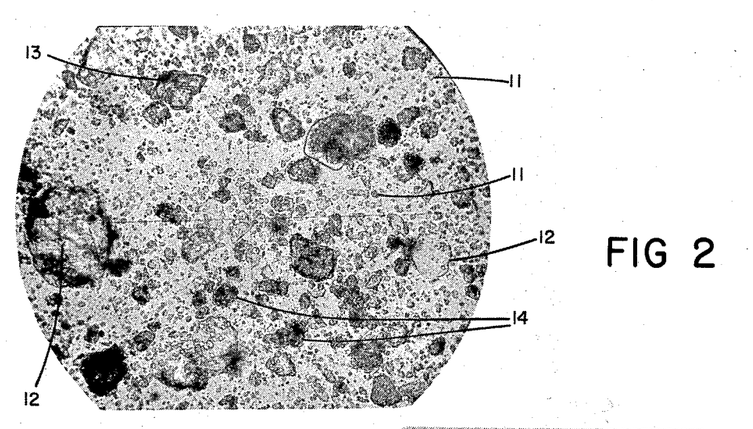
FIG. 2 is a photomicrograph at 50× of a conventional dry blended cake mix.
Figure 3:
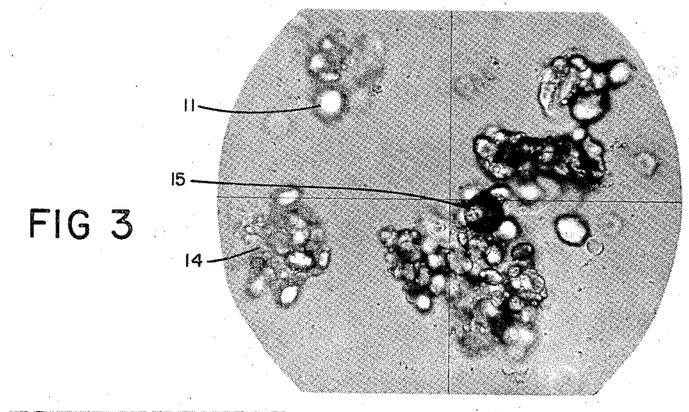
FIG. 3 is a photomicrograph at 225× of the composition of FIG. 2 after the addition of a drop of water to the microscope slide.
Figure 4:
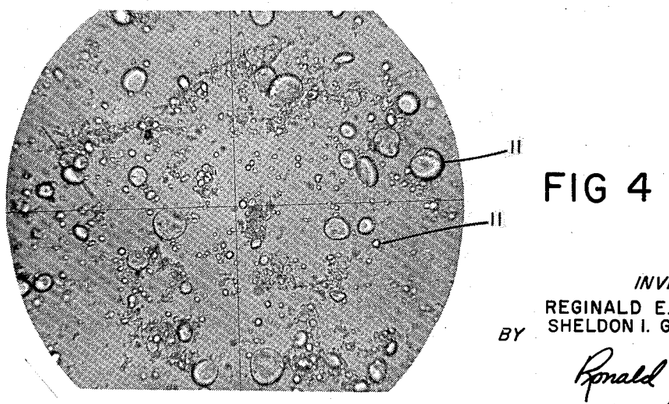
FIG. 4 is a photomicrograph at 225× of the composition of FIG. 3 after further mixing.

The products of the present invention and their differences from prior conventional compositions may best be described by reference to FIGURES 2 through 13, which are photomicrographs showing a typical composition of the prior art and several compositions of the present invention. Referring first to FIGURES 2 through 4, which illustrate the conventional dry-blended cake mix, in dry form in FIGURE 2, in wetted form in FIGURE 3, and batter form in FIGURE 4, it may be seen from FIGURE 2 that such compositions consist of mere intimate mixtures of the ingredients. The round smooth particles designated by reference 11 are free starch granules which have their origin in the flour used in the mix. Distributed throughout the mix are crystals of sucrose 12, a crystal of sodium bicarbonate 13, and flour particles of the starch-protein agglomerate form 14. The shortening content of the mix is distributed rather uniformly over the surfaces of the particles and cannot be seen in FIGURE 2. Also free protein particles are not visible.

Referring now to FIGURE 3, which is a photomicrographic view of the product shown in FIGURE 2 after the addition of a drop of water to the microscope slide followed by mixing only to the extent required to disperse the mix, it may be seen that the soluble crystalline material has dissolved and is no longer visible. Free starch granules 11 are dispersed in the water and the flour particles of the starch-protein agglomerate form 14 are beginning to break up. Dark spheres 15 are air bubbles. FIGURE 4 shows the composition of FIGURE 3 after further mixing under the microscope cover glass. It may be seen that a greater number of free starch granules 11 are dispersed in the batter but a number of flour particles of the starch-protein agglomerate form 14 remain intact. Again the shortening content is not visible but it was noted in the preparation of FIGURE 4 that a portion of the shortening content of the mix floated on the surface of the batter.

Figure 5:
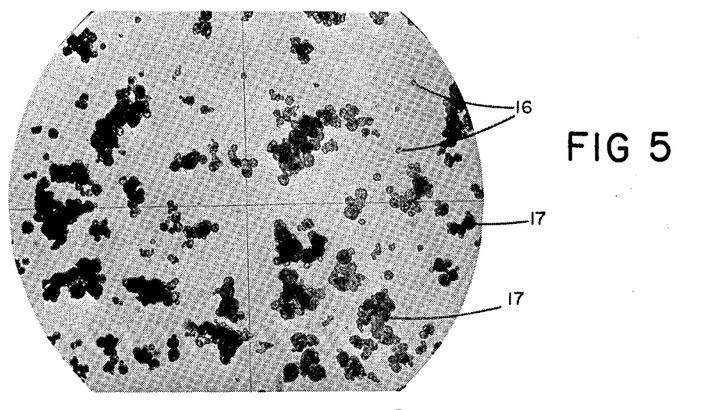
FIG. 5 is a photomicrograph at 50× of a composition containing flour, sugar and shortening processed in accordance with the present invention.
Figure 6:
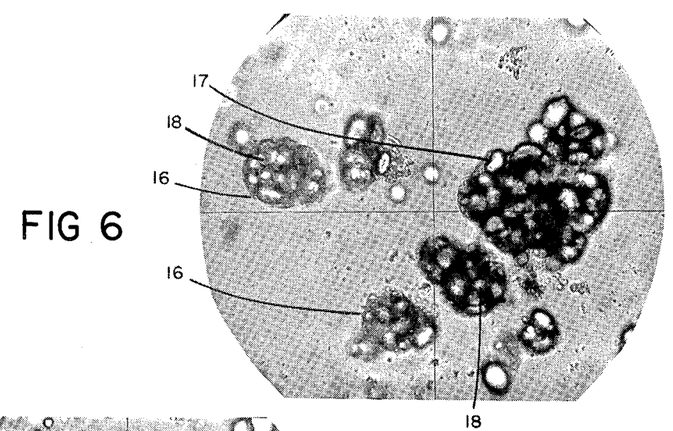
FIG. 6 is a photomicrograph at 225× of the composition of FIG. 5 after the addition of a drop of water to the microscope slide.
Figure 7:
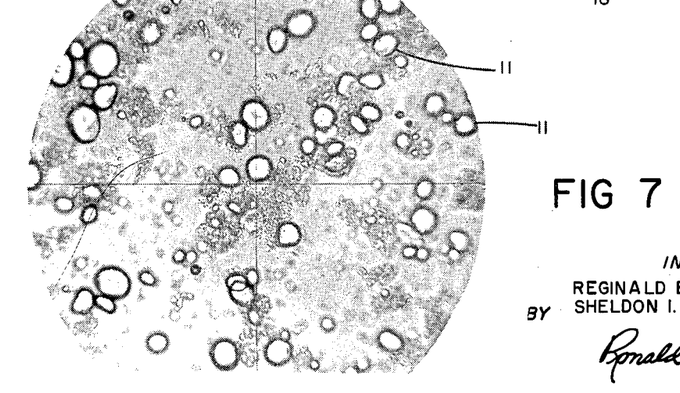
FIG. 7 is a photomicrograph at 225× of the composition of FIG. 6 after further mixing.

Turning now to the products of the present invention, FIGURES 5 through 7 illustrate a spray-dried flour-sugar-shortening (emulsified) composition having a ratio of ingredients of 4 to 2 to 1; FIGURE 5 illustrates the dry product; FIGURE 6 shows the product after the addition of a drop of water to the microscope slide with minimal mixing; and FIGURE 7 shows the product after further mixing into a batter. Referring first to FIGURE 5 it may be seen that the product is composed of a number of spherically shaped particles 16, many of which are attached to each other to form larger crystals or agglomerates 17. It should be noted that no crystalline material is present and that the starch granules and other small particles shown in FIGURE 2 are incorporated into the spherical particles 16.

FIGURE 6 shows (at higher magnification) the products of FIGURE 5 after the addition of a drop of water to the microscope slide. With the addition of water the agglomerates 17 and spheres 16 are breaking up with the dissolution of soluble material. It may be seen that spherical particles 16 are actually clusters of starch granules 18 held together by the other components of the mix (namely flour protein, sucrose in amorphous form, shortening and emulsifier). It will be noted below that the present process when applied to other products within the scope of the invention take the same form of clusters of starch granules bound together by the other ingredients of the product.

Figure 8:
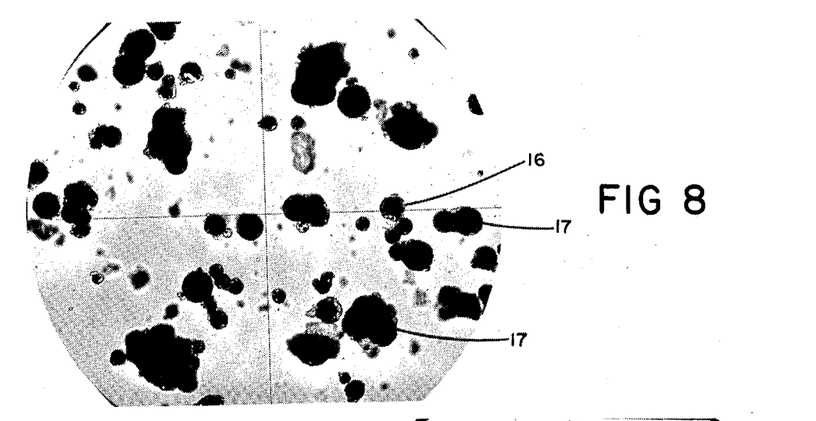
FIG. 8 is a photomicrograph at 50× of a composition containing flour and sugar processed in accordance with the present invention.
Figure 9:
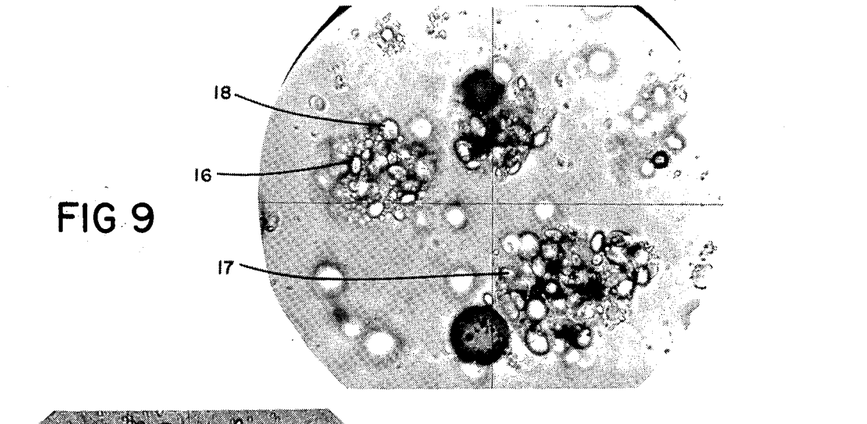
FIG. 9 is a photomicrograph at 225× of the composition of FIG. 8 after the addition of a drop of water to the microscope slide.
Figure 10:
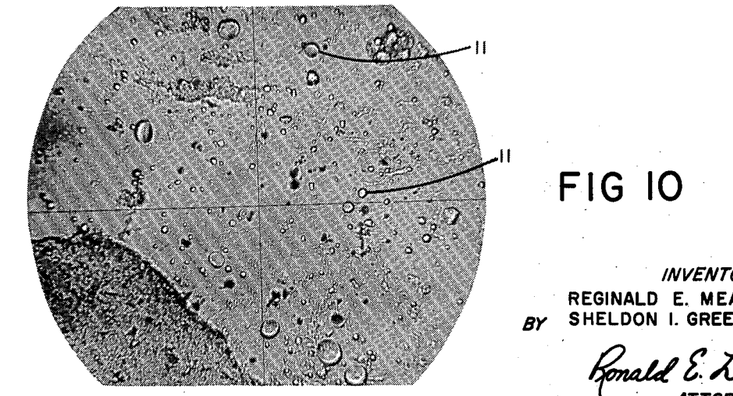
FIG. 10 is a photomicrograph at 225× of the composition of FIG. 9 after further mixing.

FIGURES 8 through 10 illustrate a spray-dried embodiment of the invention in which flour and sugar are the only components of the premix. FIGURE 8 shows the product in dry form; FIGURE 9 shows the product after the addition of a drop of water to the microscope slide; and FIGURE 10 shows the product after agitation of the water-dry product mix to stimulate a batter. From an examination of these figures it may be seen that the flour-sugar composition is in all respects identical in structure to the composition shown in FIGURES 5 through 7. In its dry form the composition consists of spherically shaped clusters bound together with the other ingredients of the mix. In the case of the flour-sugar composition illustrated in FIGURES 8 through 10, sugar in the amorphous form is the only binding agent for the starch granules.

Figure 11:
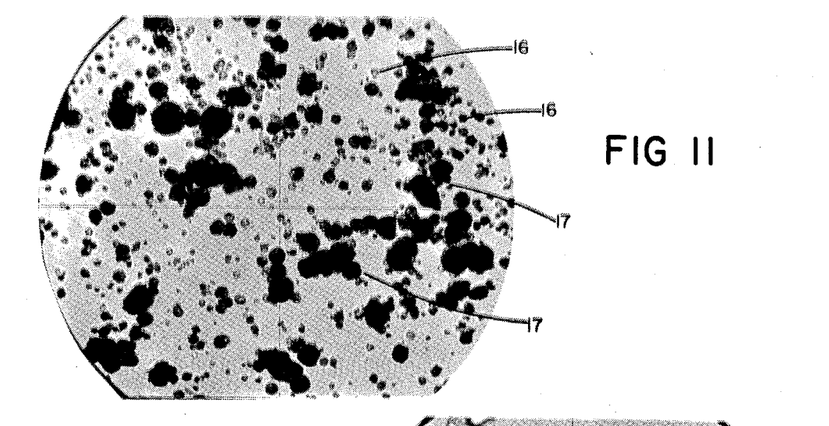
FIG. 11 is a photomicrograph at 50× of a composition containing flour and shortening.
Figure 12:
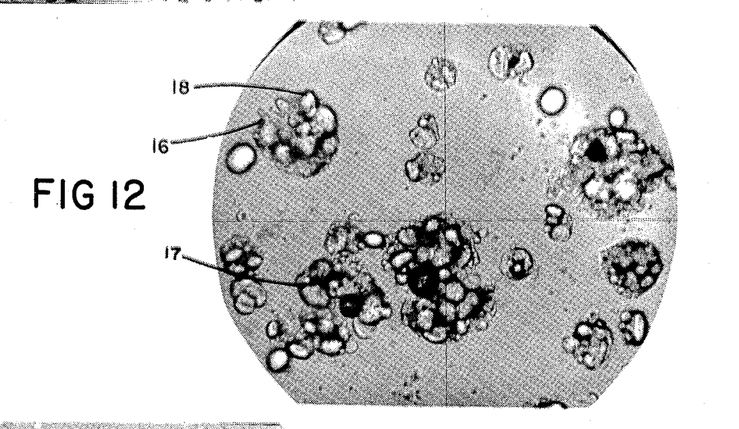
FIG. 12 is a photomicrograph at 225× of the composition of FIG. 11 after the addition of a drop of water to the microscope slide.
Figure 13:
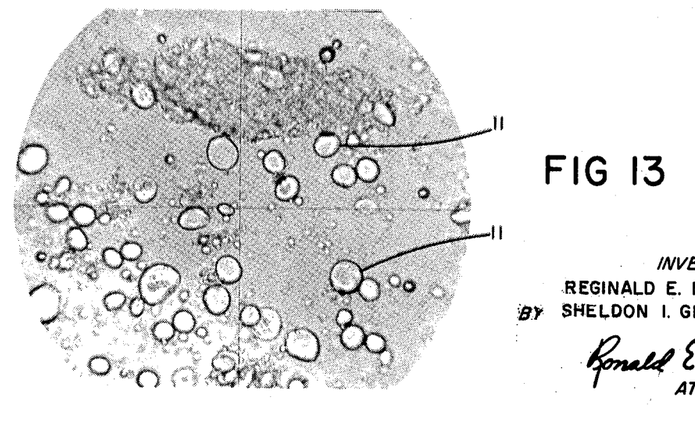
FIG. 13 is a photomicrograph at 225× of the composition of FIG. 12 after further mixing.

FIGURES 11 through 13 show a spray-dried flour-emulsified shortening composition. FIGURE 11 illustrates the dry form of the composition; FIGURE 12 illustrates the product after the addition of a drop of water to the microscope slide; and FIGURE 13 shows the product after agitation of the water-dry product mix to simulate a batter. Again it will be noted that the dry composition takes the form of spherical particles, many of which take the form of agglomerates. In FIGURE 12 it may be seen that parts of the flour-emulsified shortening composition are identical in structure to the particles described in connection with the previous figures in that they consist of clusters of starch particles bound together with the other ingredients of the mix, in this case, shortening, emulsifier, and flour protein.

The spray-dried products of the present invention are further characterized by a reduction in the amount of organic-solvent extractable fat they possess as compared to mere dry-blended products made from the same ingredients in the same proportions. For example, a spray-dried product having a total fat content of 12.02 has been found to have an ethyl ether extractable fat content of only 8.87. In contrast, a conventional dry-blended mix having the same ingredients in the same proportions has been found to have an ethyl ether extractable fat content of 10.42.

To describe the invention in greater detail, the following illustrative examples are offered.

Example I.—Spray dried flour-sugar-shortening emulsifier premix 11.35 lbs. of rearranged and deodorized lard was placed in a 75 gallon heated kettle equipped with an agitator and heated to a temperature of 135° F. at which point the lard was melted. To the melted lard were added 1.68 lbs. of a 42% alpha monoglyceride, 0.52 lb. of a 95% pure propylene glycol monoester and 0.49 lb. of sorbitan monostearate and mixed thoroughly. 110 lbs. of water was placed in a separate mixing kettle having a capacity of 150 gallons and heated to 120° F. To the hot water 0.056 lb. of polyoxyethylene sorbitan monostearate was added with thorough mixing. Then 29 lbs. of sucrose was added with continued agitation until the sucrose was dissolved.

The melted shortening and emulsifier system from the first kettle were then pumped into the second kettle under agitation, the temperature being maintained within the range of 120° to 125° F. This mixture was then recirculated for five minutes through a model 8M3 Oakes mixer operating at 1750 r.p.m. until the mixture was emulsified. 55 lbs. of flour was then added and the mixture was again recirculated through the Oakes mixer for an additional fifteen minutes.

The resultant emulsion was fed to a horizontal, concurrent-flow Blaw-Knox spray dryer having a capacity of approximately 175 lbs. per hour (water removal basis) equipped with a number 67 orifice pressure nozzle through a high-pressure piston pump operating at a pressure of approximately 3500 p.s.i.g. In the dryer, air was admitted at a temperature within the range of 320° to 325° F. and had an outlet temperature of 190° F. Approximately 70 lbs. of free-flowing premix was collected.

A cake mix containing 52.5 parts by weight additional sucrose (i.e., in addition to the premix amorphous sugar) for each 100 parts by weight premix flour was prepared by adding to 70 lbs. of the spray-dried premix, 20.6 lbs. of sucrose, 4 lbs. of dextrose, 0.85 lb. of sodium chloride, 0.95 lb. sodium bicarbonate, 0.95 lb. sodium acid pyrophosphate, 0.45 lb. of anhydrous monocalcium phosphate, 1.0 lb. of yellow color, and 0.5 lb. of vanilla flavor were added and thoroughly mixed in a ribbon blender.

From this final mix six cakes were baked using the following recipes, two whole eggs being added in each instance.

| Cake No. | Amount Of Mix, oz. | Amount Of Water Added | Mixing Procedure | Baking Temperature, ° F. |
| --- | --- | --- | --- | --- |
| 1 | 16 | 1¼ c.+60 ml. | Blend 1 min. and beat 1 min. | 372 |
| 2 | 16 | 1¼ c. | Blend 1 min. and beat 2 min. | 350 |
| 3 | 16 | 1¼ c.−60 ml. | Blend 1 min. and beat 3 min. | 325 |
| 4 | 18 | 1¼ c.+60 ml. | Blend 1 min. and beat 1 min. | 375 |
| 5 | 18 | 1¼ c. | Blend 1 min. and beat 2 min. | 350 |
| 6 | 18 | 1¼ c.−60 ml. | Blend 1 min. and beat 3 min. | 325 |

The cakes baked as noted above were compared to six cakes containing the same ingredients but produced by dry blending in accordance with conventional prior art techniques and prepared according to the receipes set forth above with the exception that all beating times were increased by two minutes because of the slow batter development time associated with conventional mixes. This increased beating time for conventional mixes was used throughout the experimentation on which these examples are based, unless otherwise noted herein. A comparison of the cakes of the present invention with those of the prior art at equal mixing times may be seen in Example XII below. After baking the volume of all cakes was determined by use of a mechanical three-point volume meter. The results are as follows:

| Cake No. | Volume Of Cakes Made In Accordance With The Invention | Volume of Cakes Baked From Conventional Cake Mix |
| --- | --- | --- |
| 1 | 82 | 48 |
| 2 | 87 | 71 |
| 3 | 91 | 82 |
| 4 | 92 | 77 |
| 5 | 98 | 80 |
| 6 | 100 | 93 |

From the above it may be seen the cakes produced in accordance with the invention consistently displayed higher volumes with less mixing than did conventional mixes. In addition, it is also apparent that the present invention provides a mix having an increased tolerance to recipe variations. The recipes given for cakes 2 and 5 may be considered normal for the amount of mix set forth. Cakes 1 and 4 were prepared by a recipe in which excess water, an insufficient mixing time, and an excessive oven temperature were used. Cakes 3 and 6 were prepared by a recipe in which an insufficient amount of water, an excessive amount of mixing and an insufficient oven temperature were used. It is quite apparent from the volumes set forth in the table above that the cakes of the present invention displayed much less variation than did the cakes made from conventional cake mix. For example, in the groups 1–3 the cakes of the present invention displayed a volume variation of only 9 points on the arbitrary scale whereas the cakes baked from the conventional mix displayed a volume variation of 34 points on the same scale. Moreover, the cakes processed in accordance with the present invention manifested a greater "moistness" and a less crumbly texture when eaten than did the cakes baked from conventional mix.

I. The above parts by weight of emulsified shortening and sucrose for each 100 parts by weight premix flour are based upon the following calculations:

A. Parts by weight premix sucrose for each 100 parts by weight premix flour:

$$\frac{29 \text{ lbs. sucrose}}{55 \text{ lbs. flour}} \times 100 \text{ parts by weight} =$$

52.72 parts by weight premix sucrose for each 100 parts of premix flour

B. Parts by weight emulsified shortening for each 100 parts by weight premix flour:

(1) Total emulsified shortening premix weight is as follows:

| Ingredient: | Pounds |
|---|---|
| Lard | 11.35 |
| Alpha monoglyceride | 1.68 |
| Propylene glycol monoester | 0.52 |
| Sorbitan monostearate | 0.49 |
| Polyoxyethylene sorbintan monostearate | 0.056 |
| Total | 14.096 |

(2) Parts by weight emulsified shortening:

$$\frac{14.096 \text{ lbs. emulsified shortening}}{55 \text{ lds. flour}} \times$$

100 parts by weight flour = 25.629 parts by weight of premix emulsified shortening for each 100 parts by weight premix flour II. The amount of crystalline sucrose added to the premix based upon 100 parts by weight premix flour is derived from the following calculations:

A. Amount of premix flour employed in making the final cake mix: Since 98.096 lbs. of ingredients were initially employed in providing the spray-dried flour-sugar-shortening-emulsified premix and only 70 lbs. of the resultant spray-dried premix thereof was employed, the actual weight of the premix flour is derived as follows:

$$\frac{70 \text{ lbs. premix ingredient}}{98.096 \text{ lbs. ingredients}} \times$$

55 lbs. flour = 39.245 lbs. premix flour

B. Amount of added crystalline sucrose for each 100 parts by weight premix flour:

$$\frac{20.06 \text{ lbs. added crystalline sucrose}}{39.247 \text{ lbs. premix flour}} \times$$

100 parts by weight = 52.488 parts by weight added crystalline sugar for each 100 parts by weight premix flour Example II.—Repeat of Example I with only part of shortening processed A cake premix was made according to the procedure set forth in Example I but with the amounts of ingredients as set forth below:

| | Lbs. |
|---|---|
| Flour | 60 |
| Sugar | 30 |
| Rearranged and deodorized lard | 4.03 |
| Sorbitan monostearate | 0.175 |
| Polyoxyethylene sorbitan monostearate | 0.02 |
| Alpha monoglyceride | 0.60 |
| Proplyene glycol monostearate | 0.185 |
| Water | 105 |

To 61.82 lbs. of the spray-dried premix, 21.63 lbs. sucrose, 4 lbs. dextrose, 0.85 lb. sodium chloride, 0.95 lb. sodium bicarbonate, 0.95 lb. sodium acid pyrophosphate, 0.45 lbs. anhydrous monocalcium phosphate, 1.0 lbs. yellow color, 0.5 lbs. vanilla flavor and 6.7 lbs. of emulsified shortening were added and the mixture thoroughly blended in a ribbon blender.

From this final mix nine cakes were baked in accordance with the following recipes, two whole eggs being used in the preparation of each cake.

| Cake No. | Amount Of Mix, oz. | Amount Of Water Added | Mixing Procedure | Baking Temperature, °F. |
|---|---|---|---|---|
| 1 | 16 | 1¼ c.+60 ml. | Blend 1 min. and beat 1 min. | 375 |
| 2 | 16 | 1¼ c. | Blend 1 min. and beat 2 min. | 350 |
| 3 | 16 | 1¼ c.−60 ml. | Blend 1 min. and beat 3 min. | 325 |
| 4 | 18 | 1¼ c.+60 ml. | Blend 1 min. and beat 1 min. | 375 |
| 5 | 18 | 1¼ c. | Blend 1 min. and beat 2 min. | 350 |
| 6 | 18 | 1¼ c.−60 ml. | Blend 1 min. and beat 3 min. | 325 |
| 7 | 20 | 1⅓ c.+60 cc. | Blend 1 min. and beat 1 min. | 375 |
| 8 | 20 | 1⅓ c. | Blend 1 min. and beat 2 min. | 350 |
| 9 | 20 | 1⅓ c.−60 cc. | Blend 1 min. and beat 3 min. | 325 |

The cakes baked in accordance with the recipes above were compared to nine cakes baked from a mix containing the same ingredients but produced by dry blending in accordance with conventional techniques. The cakes were prepared in accordance with the recipes set forth for cakes 1–9 above, with the exception that beating times were increased by two minutes as in Example I. The volumes of all cakes were measured and the results are set forth in the table below:

| Cake No. | Volume Of Cakes Made In Accordance With The Invention | Volume of Cakes Baked From Conventional Cake Mix |
|---|---|---|
| 1 | 58 | 49 |
| 2 | 78 | 68 |
| 3 | 84 | 79 |
| 4 | 77 | 72 |
| 5 | 91 | 78 |
| 6 | 93 | 87 |
| 7 | 91 | 82 |
| 8 | 97 | 93 |
| 9 | 103 | 98 |

From the above it may be seen the cakes produced in accordance with the invention consistently displayed higher volumes with less mixing than did conventional mixes. In addition, it is also apparent that the present invention provides a mix having an increased tolerance to recipe variations. The recipes given for cakes 2, 5 and 8 may be considered normal for the amount of mix set forth. Cakes 1, 4 and 7 were prepared by a recipe in which excess water, an insufficient mixing time, and an excessive oven temperature were used. Cakes 3, 6 and 9 were prepared by a recipe in which an insufficient amount of water, an excessive amount of mixing, and an insufficient oven temperature were used. It is quite apparent from the volumes set forth in the table above that the cakes of the present invention displayed much less variation than did the cakes made from conventional cake mix. For example, in the groups 1–3 the cakes of the present invention displayed a volume variation of only 16 points on the arbitrary scale whereas the cakes baked from the conventional mix displayed a volume variation of 30 points on the same scale. Moreover, the cakes processed in accordance with the present invention manifested a greater "moistness" when eaten than did the cakes baked from conventional cake mix and were also less crumbly.

I. The above parts by weight of emulsified shortening and sucrose for each 100 parts by weight premix flour are ascertained by the following calculations:

A. Parts by weight premix sucrose for each 100 parts by weight premix flour:

$$\frac{30 \text{ lbs. sucrose}}{60 \text{ lbs. flour}} \times 100 \text{ parts by weight} =$$

50 parts by weight premix sucrose for each 100 parts of premix flour

B. Parts by weight emulsified shortening for each 100 parts by weight premix flour:

(1) Total emulsified shortening premix weight is as follows:

| Ingredient: | Pounds |
|---|---|
| Lard | 4.03 |
| Sorbitan monostearate | 0.175 |
| Polyoxyethylene sorbitan monostearate | 0.02 |
| Alpha monoglyceride | 0.60 |
| Propylene glycol monostearate | 0.185 |
| Total | 5.010 |

(2) Parts by weight emulsified shortening:

$$\frac{5.010 \text{ lbs. emulsified shortening}}{60 \text{ lbs. flour}} \times$$

100 parts by weight flour = 8.35 parts by weight of premix emulsified shortening for each 100 parts by weight premix flour II. The amount of crystalline sucrose added to the premix upon 100 parts by weight premix flour is derived from the following calculations:

A. Amount of premix flour employed in making the final cake mix: Since 95.01 lbs. of ingredients were initially employed in providing the spray-dried flour-sugar-shortening-emulsified premix and only 61.82 lbs. of the resultant spray-dried premix thereof was employed, the actual weight of the premix flour in the cake mix is derived as follows:

$$\frac{60 \text{ lbs. premix ingredient}}{95.01 \text{ lbs. ingredients}} \times$$

61.82 lbs. flour = 39.04 lbs. premix flour

B. Amount of added crystalline sucrose in the cake mix for each 100 parts by weight premix flour is ascertained as follows:

$$\frac{21.63 \text{ lbs. added crystalline sucrose}}{39.04 \text{ lbs premix flour}} \times$$

100 parts by weight = 55.4 parts by weight added crystalline sugar for each 100 parts by weight premix flour Example III.—Unprocessed sugar and flour added to spray-dried premix A cake premix was made according to the procedure set forth in Example I but with the amounts of ingredients as set forth below:

| | Lbs. |
|---|---|
| Flour | 40 |
| Sugar | 40 |
| Rearranged and deodorized lard | 24.15 |
| Sorbitan monostearate | 1.05 |
| Polyoxyethylene sorbitan monostearate | 0.12 |
| Alpha monoglyceride | 3.57 |
| Propylene glycol monostearate | 1.11 |
| Water | 90 |

To 36.67 lbs. of the spray-dried premix, 27.82 lbs. sucrose, 4 lbs. dextrose, 0.85 lb. sodium chloride, 0.95 lb. sodium bicarbonate, 0.95 lb. sodium acid pyrophosphate, 0.45 lb. anhydrous monocalcium phosphate, 1.0 lb. yellow color, 25.2 lbs. flour and 0.5 lb. of vanilla flavor were added and the mixture thoroughly blended in a ribbon blender.

From this final mix nine cakes were baked in accordance with the recipes set forth in Example II.

The baked cakes were compared to nine cakes baked from a mix containing the same ingredients but produced by dry blending in accordance with conventional techniques. The cakes were prepared in accordance with the same recipes used for experimental cakes with the exception that beating times were increased two minutes. The volumes of all cakes were measured and the results are set forth in the able below:

| Cake No. | Volume Of Cakes Made In Accordance With The Invention | Volume of Cakes Baked From Conventional Cake Mix |
|---|---|---|
| 1 | 67 | 49 |
| 2 | 79 | 68 |
| 3 | 82 | 79 |
| 4 | 80 | 72 |
| 5 | 88 | 78 |
| 6 | 91 | 87 |
| 7 | 91 | 82 |
| 8 | 99 | 93 |
| 9 | 99 | 98 |

From the above it may be seen the cakes produced in accordance with the invention consistently displayed higher volumes. In addition, it is also apparent that the present invention provides a mix having an increased tolerance to recipe variations. The recipes given for cakes 2, 5 and 8 may be considered normal for the amount of mix set forth. Cakes 1, 4 and 7 were prepared by a recipe in which excess water, an insufficient mixing time, and an excessive oven temperature were used. Cakes 3, 6 and 9 were prepared by a recipe in which an insufficient amount of water, an excessive amount of mixing and an insufficient oven temperature were used. It is quite apparent from the volumes set forth in the table above that the cakes of the present invention displayed much less variation than did the cakes made from conventional cake mix. For example, in the groups 1–3 the cakes of the present invention displayed a volume variation of only 15 points on the arbitrary scale whereas the cakes baked from the conventional mix displayed a volume variation of 30 points on the same scale. Moreover, the cakes processed in accordance with the present invention manifested a greater "moistness" when eaten than did the cakes baker from conventional cake mix and were also less crumbly.

I. The above parts by weight of emulsified shortening and sucrose for each 100 parts by weight premix flour are based upon the following calculations:

A. Parts by weight premix sucrose for each 100 parts by weight premix flour:

$$\frac{40 \text{ lbs. sucrose}}{40 \text{ lbs. flour}} \times 100 \text{ parts by weight} =$$

100 parts by weight premix sucrose for each 100 parts of premix flour

B. Parts by weight emulsified shortening for each 100 parts by weight premix flour:

(1) Total emulsified shortening premix weight is as follows:

| Ingredient: | Pounds |
|---|---|
| Lard | 24.15 |
| Sorbitan monostearate | 1.05 |
| Polyoxyethylene sorbitan monostearate | 0.12 |
| Alpha monoglyceride | 3.57 |
| Propylene glycol monostearate | 1.11 |
| Total | 30.08 |

(2) Parts by weight emulsified shortening:

$$\frac{30.08 \text{ lbs. emulsified shortening}}{40.0 \text{ lbs. flour}} \times$$

100 parts by weight flour=75.2 parts by weight of premix emulsified shortening for each 100 parts by weight premix flour II. The amount of crystalline sucrose added to the premix based upon 100 parts by weight of premix flour is derived from the following calculations:

A. Amount of premix flour employed in making the final cake mix: Since 110.08 lbs. of ingredients were initially employed in providing the spray-dried flour-sugar-shortening-emulsified premix and only 36.67 lbs. of the resultant spray-dried premix thereof was employed, the actual weight of the premix flour is derived as follows:

$$\frac{40 \text{ lbs. premix ingredient}}{110.08 \text{ lbs. ingredients}} \times$$

36.67 lbs. flour=13.33 lbs. premix flour

B. Amount of added crystalline sucrose in the cake mix for each 100 parts by weight premix flour is derived from the following calculations:

$$\frac{27.82 \text{ lbs. added crystalline sucrose}}{13.33 \text{ lbs. premix flour}} \times$$

100 parts by weight=208.7 parts by weight added crystalline sugar for each 100 parts by weight premix flour Example IV.—Spray-dried flour-sugar premix 90 lbs. of water was placed in the 150 gallon mixing kettle described in Example I and heated to a temperature of 125° F. To the heated water 40 lbs. sucrose was added with mixing until the sucrose was thoroughly dispersed and dissolved. To the sugar-water solution 70 lbs. of flour was added with continuous agitation and the entire mixture was circulated through the Oakes mixer for fifteen minutes. After mixing, the product was spray-dried as described in Example I above to provide a dry, free-flowing premix.

To 61.36 lbs. of the premix, the following ingredients in the amounts stated were added to form a final cake mix: 18.84 lbs. sucrose; 4.0 lbs. dextrose; 10.0 lbs. shortening (emulsified); 0.85 lb. sodium chloride; 0.95 lb. sodium bicarbonate; 0.95 lb. sodium acid pyrophosphate; 0.45 lb. anhydrous monocalcium phosphate; 1.0 lb. yellow color; and 0.5 lb. vanilla flavor. The above ingredients and the premix were thoroughly blended in a ribbon blender.

From the final mix nine cakes were baked in accordance with the recipes set forth in Example II, two whole eggs being added in the preparation of each cake.

The baked cakes were compared to nine cakes baked from a mix containing the same ingredients but produced by dry blending in accordance with conventional techniques. The cakes were prepared in accordance with the recipes set forth for experimental cakes. The volumes of all cakes were measured and the results are set forth in the table below:

| Cake No. | Volume Of Cakes Made In Accordance With The Invention | Volume of Cakes Baked From Conventional Cake Mix |
|---|---|---|
| 1 | 58 | 49 |
| 2 | 78 | 68 |
| 3 | 84 | 79 |
| 4 | 77 | 72 |
| 5 | 91 | 78 |
| 6 | 93 | 87 |
| 7 | 91 | 82 |
| 8 | 97 | 93 |
| 9 | 103 | 98 |

Again, it may be seen that the volume and tolerance of the cakes baked in accordance with the invention were both improved.

I. The above parts by weight of premix sucrose for each 100 parts by weight premix flour are based upon the following calculations:

A. Parts by weight premix sucrose for each 100 parts by weight premix flour:

$$\frac{40 \text{ lbs. sucrose}}{70 \text{ lbs. flour}} \times 100 \text{ parts by weight}=$$

57.14 parts by weight premix sucrose for each 100 parts of premix flour

II. The amount of crystalline sucrose added to the premix based upon 100 parts by weight premix flour is derived from the following calculations:

A. Amount of premix flour employed in making the final cake mix: Since 110.0 lbs. of ingredients were initially employed in providing the spray-dried premix and only 61.36 lbs. of the resultant spray-dried premix thereof was employed, the actual weight of the premix flour is derived as follows:

$$\frac{70 \text{ lbs. premix ingredient}}{110 \text{ lbs. ingredients}} \times$$

61.36 lbs. flour=39.04 lbs. premix flour

B. Amount of added crystalline sucrose for each 100 parts by weight premix flour:

$$\frac{18.84 \text{ lbs. added crystalline sucrose}}{39.047 \text{ lbs. premix flour}} \times$$

100 parts by weight=48.25 parts by weight added crystalline sugar for each 100 parts by weight premix flour Example V.—Spray-dried flour-emulsified shortening premix 110 lbs. of water was placed in the 150 gallon mixer kettle described in Example I and heated to a temperature of 125° F. To the hot water 0.08 lb. of polyoxyethylene sorbitan monostearate was added with continued mixing until the polyoxyethylene sorbitan monostearate had thoroughly dispersed in the water. In the 75 gallon mixing kettle 16.42 lbs. of rearranged and deodorized lard was melted and thoroughly mixed with 0.71 lb. or sorbitan monostearate, 0.75 lb. of propylene-glycol monostearate, and 2.43 lbs. of 42% alpha monoglyceride. The resultant mixture was maintained at a temperature of approximately 120° F. and agitated until all components were thoroughly mixed. The lard and additives were then pumped into the 150 gallon kettle with mixing and the resultant mixture was circulated through the Oakes mixer at the conditions given in Example I for a period of approximately five minutes. 79.60 lbs. of flour was then added and the resultant mixture circulated through the Oakes mixer for a period of approximately fifteen minutes. The emulsion thus formed was then spray-dried as described in Example I and a free-flowing dry premix resulted.

To 49.05 lbs. of the spray-dried premix, the following ingredients in the amounts thereof were added to form a final cake mix: 41.15 lbs. sucrose, 4.0 lbs. dextrose, 0.85 lb. sodium chloride, 0.95 lb. sodium bicarbonate, 0.95 lb. sodium acid pyrophosphate, 0.45 lb. anhydrous monocalcium phosphate, 1.0 lb. yellow color, and 0.5 lb. vanilla flavor.

From this final mix nine cakes were baked in accordance with the following recipes:

| Cake No. | Amount Of Mix, oz. | Amount Of Water Added | Mixing Procedure | Baking Temperature, °F. |
|---|---|---|---|---|
| 1 | 16 | 1¼ c.+60 cc | Blend 1 min. and beat 1 min. | 375 |
| 2 | 16 | 1¼ c. | Blend 1 min. and beat 2 min. | 350 |
| 3 | 16 | 1¼ c.−60 cc | Blend 1 min. and beat 3 min. | 325 |
| 4 | 17.5 | 1¼ c.+60 cc | Blend 1 min. and beat 1 min. | 375 |
| 5 | 17.5 | 1¼ c. | Blend 1 min. and beat 2 min. | 350 |
| 6 | 17.5 | 1¼ c.−60 cc | Blend 1 min. and beat 3 min. | 325 |
| 7 | 20 | 1¼ c.+60 cc | Blend 1 min. and beat 1 min. | 375 |
| 8 | 20 | 1¼ c. | Blend 1 min. and beat 2 min. | 350 |
| 9 | 20 | 1¼ c.−60 cc | Blend 1 min. and beat 3 min. | 325 |

The cakes baked in accordance with the recipes above were compared with nine cakes baked from a mix containing the same ingredients but produced by dry blending in accordance with conventional techniques. The cakes were prepared in accordance with the recipes set forth for cakes 1–9 above. The volumes of all cakes were measured and the results are set forth in the table below:

| Cake No. | Volume Of Cakes Made In Accordance With The Invention | Volume of Cakes Baked From Conventional Cake Mix |
|---|---|---|
| 1 | 70 | 41 |
| 2 | 77 | 58 |
| 3 | 78 | 70 |
| 4 | 74 | 54 |
| 5 | 82 | 68 |
| 6 | 85 | 80 |
| 7 | 91 | 78 |
| 8 | 94 | 82 |
| 9 | 98 | 88 |

From the above it may be seen the cakes produced in accordance with the invention consistently displayed higher volumes. In addition, it is also apparent that the present invention provides a mix having an increased tolerance to recipe variations. The recipes given for cakes 2, 5 and 8 may be considered normal for the amount of mix set forth. Cakes 1, 4 and 7 were prepared by a recipe in which excess water, an insufficient mixing time, and an excessive oven temperature were used. Cakes 3, 6 and 9 were prepared by a recipe in which an insufficient amount of water, an excessive amount of mixing and an insufficient oven temperature were used. It is quite apparent from the volumes set forth in the table above that the cakes of the present invention displayed much less variation than did the cakes made from conventional cake mix. For example, in the group 1–3 the cakes of the present invention displayed a volume variation of only 8 points on the arbitrary scale whereas the cakes baked from the conventional cake mix displayed a volume variation of 29 points on the same scale. Moreover, the cakes processed in accordance with the present invention manifested a greater "moistness" when eaten than did the cakes baked from conventional mix and were also less crumbly.

Example VI.—Preparing premix by vacuum drying 6.25 lbs. of water was placed in a mixing bowl and raised to a temperature of 125° F. 8.56 lbs. of sugar and 0.01 lb. of polyoxyethylene sorbitan monostearate were added with low speed mixing until a solution was formed. 2.06 lbs. of a melted shortening composition containing 1.67 lbs. of lard, 0.24 lb. of 42% alpha monoglyceride, 0.07 lb. of propylene glycol monoester, and 0.09 lb. sorbitan monostearate were added to the sugar solution with continued slow-speed mixing. Then 8.12 lbs. of flour was blended in with continued slow-speed mixing until a stable batter had been formed. The batter was poured into water-heated vacuum drying trays to a depth of ½ to ¾ inch and dried for sixteen hours at 140° F. at a vacuum of 28″ Hg. The dry cake which resulted was cooled and comminuted to a fine powder in a hammer mill. Approximately 24 lbs. of dry comminuted premix was recovered.

A final cake mix was prepared by adding to 22.8 lbs. of the above premix 1.0 lb. of dextrose, 0.21 lb. of sodium chloride, 0.24 lb. of sodium bicarbonate, 0.24 lb. of sodium acid pyrophosphate, 0.11 lb. of anhydrous monocalcium phosphate, 0.25 lb. yellow color, and 0.13 lb. vanilla flavor.

From this final mix three cakes were baked in accordance with the following recipes, two whole eggs being used in the preparation of each cake:

| Cake No. | Amount Of Mix, oz. | Amount Of Water Added | Mixing Procedure | Baking Temperature, °F. |
|---|---|---|---|---|
| 1 | 17.5 | 1¼ c.+60 ml | Blend 1 minute and beat 1 min. | 375 |
| 2 | 17.5 | 1¼ c. | Blend 1 min. and beat 2 mins. | 350 |
| 3 | 17.5 | 1¼ c.−60 ml | Blend 1 min. and beat 3 mins. | 325 |

The baked cakes were compared to three cakes baked from a conventional, dry-blended cake mix containing the same ingredients and prepared according to the same recipes as above, except that mixing was increased by two minutes in each case. The volume of all cakes was determined and is set forth in the table below:

| Cake No. | Volume Of Cakes Made In Accordance With The Invention | Volume of Cakes Baked From Conventional Cake Mix |
|---|---|---|
| 1 | 85 | 70 |
| 2 | 92 | 80 |
| 3 | 96 | 86 |

The increase in volume is again evident.

Example VII.—Spray-dried flour-shortening premix—no emulsifiers

Using the procedure and all of the ingredients except the emulsifying agents set forth in Example V above, a final cake mix was prepared. From this mix nine cakes were baked in accordance with the recipe set forth in Example V. These baked cakes were compared to nine cakes baked from a mix containing the same ingredients but produced by dry blending in accordance with conventional techniques. The volumes of all cakes were measured and the results are set forth in the table below:

| Cake No. | Volume Of Cakes Made In Accordance With The Invention | Volume of Cakes Baked From Conventional Cake Mix |
|---|---|---|
| 1 | 54 | 41 |
| 2 | 48 | 49 |
| 3 | 57 | 57 |
| 4 | 56 | 50 |
| 5 | 61 | 62 |
| 6 | 61 | 68 |
| 7 | 68 | 45 |
| 8 | 71 | 51 |
| 9 | 69 | 80 |

From the above, it may be seen that a flour-shortening (without emulsifier) premix gives advantages in volume for normal (cakes 2, 5 and 8) and excess water (cakes 1, 4 and 7) cakes when compared to a conventional control containing no emulsifier. In addition, a great increase intolerance to recipe variation is demonstrated over the conventional cakes.

Example VIII.—Spray-dried flour-sugar-shortening premix—no emulsifiers

Using the procedure and all of the ingredients except the emulsifying agents set forth in Example I above, a final mix was prepared. From this mix, nine cakes were baked in accordance with the recipe set forth in Example I. These baked cakes were compared to nine cakes baked from a mix containing the same ingredients (i.e., all ingredients except emulsifiers) but produced by dry blending in accordance with conventional techniques. The volumes of all cakes were measured and the results are set forth in the table below:

| Cake No. | Volume Of Cakes Made In Accordance With The Invention | Volume of Cakes Baked From Conventional Cake Mix |
| --- | --- | --- |
| 1 | 46 | 41 |
| 2 | 51 | 49 |
| 3 | 64 | 57 |
| 4 | 58 | 50 |
| 5 | 66 | 62 |
| 6 | 70 | 68 |
| 7 | 67 | 45 |
| 8 | 75 | 51 |
| 9 | 76 | 80 |

From the above it may be seen that a flour-sugar-shortening (without emulsifiers) premix gives advantages in volume and tolerance to recipe variation over the conventional controls. The only exceptions are cake 9 as to volume, and cakes 1, 2 and 3 as to tolerance.

Example IX.—Certain additives processed with basic ingredients 110 lbs. of water was placed in the 150 gallon mixing kettle described previously in Example I and heated to a temperature of approximately 125° F. To the hot water 0.07 lb. of polyoxyethylene sorbitan monostearate was added and dissolved after which 29 lbs. of sucrose was added with agitation until the sucrose was dissolved. In the smaller 75 gallon mixing kettle 11.6 lbs. of lard was melted at a temperature of approximately 120° F. To the melted lard were added 0.53 lb. of sorbitan monostearate, 0.14 lb. of carboxymethylcellulose, 1.42 lbs. of sodium caseinate, 1.75 lbs. of 42% alpha monoglyceride and 0.60 lb. of propylene glycol monostearate, all additions being made with agitation to form a homogeneous slurry. The slurry was then pumped into the larger 150 gallon mixing kettle with continued agitation and the resultant mixture was circulated through the Oakes mixer for a period of approximately five minutes. To the emulsion thus formed 55 lbs. of flour was added and the mixture circulated again through the Oakes mixer for a period of approximately fifteen minutes. The emulsion thus formed was fed to the spray dryer and dried to a dry free-flowing premix.

A final cake mix was prepared by mixing in a ribbon blender 70.73 lbs. of the spray-dried premix together with the following material: 20.6 lbs. sugar, 4.0 lbs. dextrose, 0.95 lb. sodium bicarbonate, 0.85 lb. salt, 0.95 lb. sodium acid pyrophosphate, 0.45 lb. anhydrous monocalcium phosphate, 1.0 lb. yellow color and 0.5 lb. vanilla flavor.

From the final mix six cakes were baked in accordance with the recipes set forth in Example I.

The baked cakes were compared to six cakes baked according to the same recipes and containing the same ingredients but produced by dry blending in accordance with conventional prior art techniques and prepared according to the recipes set forth in Example I. After baking the volume of all cakes was determined. The results are set forth in the table below:

| Cake No. | Volume Of Cakes Made In Accordance With The Invention | Volume of Cakes Baked From Conventional Cake Mix |
| --- | --- | --- |
| 1 | 75 | 48 |
| 2 | 86 | 71 |
| 3 | 90 | 82 |
| 4 | 94 | 77 |
| 5 | 96 | 86 |
| 6 | 99 | 93 |

Again, improvements in volume and tolerance to recipe variations over the conventional controls may be seen.

I. The above parts by weight of emulsified shortening and sucrose for each 100 parts by weight premix flour are based upon the following calculations:

A. Parts by weight premix sucrose for each 100 parts by weight premix flour:

$$\frac{29 \text{ lbs. sucrose}}{55 \text{ lbs. flour}} \times$$

100 parts by weight = 52.727 parts by weight premix sucrose for each 100 parts of premix flour B. Parts by weight emulsified shortening for each 100 parts by weight premix flour:

(1) Total emulsified shortening premix weight is as follows:

| Ingredient: | Pounds |
| --- | --- |
| Polyoxyethylene sorbitan monostearate | 0.07 |
| Lard | 11.60 |
| Sorbitan monostearate | 0.53 |
| Alpha monoglyceride | 1.75 |
| Propylene glycol monostearate | 0.60 |
| Total | 14.55 |

(2) Parts by weight emulsified shortening:

$$\frac{14.55 \text{ lbs. emulsified shortening}}{55 \text{ lbs. flour}} \times$$

100 parts by weight flour = 25.454 parts by weight of premix emulsified shortening for each 100 parts by weight premix flour II. The amount of crystalline sucrose added to the premix based upon 100 parts by weight premix flour is derived from the following calculations:

A. Amount of premix flour employed in making the final cake mix: Since 110.11 lbs. of ingredients were initially employed in providing the spray-dried flour-sugar-shortening-emulsified premix and only 70.73 lbs. of the resultant spray-dried premix thereof was employed, the premix flour weight provided in the cake mix is derived from the following:

$$\frac{70.73 \text{ lbs. premix ingredient}}{110.11 \text{ lbs. ingredients}} \times$$

55 lbs. flour = 38.85 lbs. premix flour

B. Amount of added crystalline sucrose for each 100 parts by weight premix flour:

$$\frac{20.6 \text{ lbs. added crystalline sucrose}}{38.85 \text{ lbs. premix flour}} \times$$

100 parts by weight = 53.01 parts by weight added crystalline sugar for each 100 parts by weight premix flour Example X.—Spray drying of a blended premix 55 lbs. of flour and 29 lbs. of sugar were blended. To the dry blend 11.35 lbs. of rearranged and deodorized lard, 1.68 lbs. of a 42% alpha monoglyceride, 0.52 lb. of a 95% pure propylene glycol monoester, 0.49 lb. of sorbitan monostearate and 0.056 lb. of polyoxyethylene sorbitan monostearate, all in the melted state, were added and blended into the mixture of sugar and flour. 89 lbs. of the resultant dry blend was placed in 100 lbs. of water having a temperature of 125° F. and circulated through an Oakes mixer for approximately fifteen minutes. The thus-formed emulsion was then spray dried in the dryer described in the previous examples and at the conditions described therein to form a dry free-flowing premix.

To 69.6 lbs. of the spray dried premix, 25.58 lbs. of sucrose, 4.00 lbs. of dextrose, 0.95 lb. of sodium bicarbonate, 0.85 lb. of sodium chloride, 0.95 lb. of sodium acid pyrophosphate, 0.45 lb. of anhydrous monocalcium phosphate, 1.0 lb. of yellow color, and 0.5 lb. of vanilla flavor were added and thoroughly mixed in a ribbon blender.

From this final mix, six cakes were baked using the recipes set forth in Example I above. The baked experimental cakes were then compared to six cakes containing the same ingredients but produced by the mixing-drying procedure set forth in Example I and baked according to the same recipes. After baking the volume of all cakes was determined. The results are as follows.

| Cake No. | Volume Of Cakes Made In Accordance With The Procedure Of This Example | Volume of Cakes Made In Accordance With The Procedure From Example I |
|---|---|---|
| 1 | 85 | 76 |
| 2 | 90 | 891 |
| 3 | 89 | 88 |
| 4 | 96 | 93 |
| 5 | 100 | 97 |
| 6 | 102 | 98 |

From the above it may be seen that the cakes produced by the procedure described in this example compared favorably with those produced by the procedure in Example I.

I. The above parts by weight of emulsified shortening and sucrose for each 100 parts by weight premix flour are based upon the following calculations:

A. Parts by weight premix sucrose for each 100 parts by weight premix flour:

$$\frac{29 \text{ lbs. sucrose}}{55 \text{ lbs. flour}} \times 100 \text{ parts by weight} =$$

52.727 parts by weight premix sucrose for each 100 parts of premix flour

B. Parts by weight emulsified shortening for each 100 parts by weight premix flour:

(1) Total emulsified shortening premix weight is as follows:

| Ingredient: | Pounds |
|---|---|
| Lard | 11.35 |
| Alpha monoglyceride | 1.68 |
| Propylene glycol monoester | 0.52 |
| Sorbitan monostearate | 0.49 |
| Polyoxyethylene sorbitan monostearate | 0.056 |
| Total | 14.096 |

(2) Parts by weight emulsified shortening:

$$\frac{14,096 \text{ lbs. emulsified shortening}}{55 \text{ lbs. flour}} \times$$

100 parts by weight flour = 25.629 parts by weight premix emulsified shortening for each 100 parts by weight premix flour II. The amount of crystalline sucrose added to the premix based upon 100 parts by weight premix flour is derived from the following calculations:

A. Amount of premix flour employed in making the final cake mix: Since 98.096 lbs. of ingredients were initially employed in providing the spray-dried flour-sugar-shortening-emulsified premix and only 69.6 lbs. of the resultant spray-dried premix thereof was employed, the actual weight of the premix flour in the cake mix is derived as follows:

$$\frac{69.6 \text{ lbs. premix ingredient}}{98.096 \text{ lbs. ingredients}} \times$$

55 lbs. flour = 39.023 lbs. premix flour

B. Amount of added crystalline sucrose for each 100 parts by weight premix flour:

$$\frac{25.58 \text{ lbs. added crystalline sucrose}}{39.023 \text{ lbs. premix flour}} \times$$

100 parts by weight = 65.55 parts by weight added crystalline sugar for each 100 parts by weight premix flour Example XI.—Chocolate cake A spray-dried premix was prepared according to the procedure set forth in Example I utilizing the following amounts of ingredients:

| | Lbs. |
|---|---|
| Flour | 103 |
| Sugar | 47.5 |
| Rearranged and deodorized lard | 21.52 |
| 42% alpha monoglyceride | 3.19 |
| Propylene glycol monoester | 0.99 |
| Sorbitan monostearate | 0.93 |
| Polyoxyethylene sorbitan monostearate | 1.12 |
| Water | 210 |

To 62.97 lbs. of the resultant spray-dried premix, 24.69 lbs. of sucrose, 3.50 lbs. cocoa, 2.70 lbs. non-fat dry milk solids, 0.85 lb. of salt, 3.79 lbs. of flour, 0.80 lb. sodium bicarbonate, 0.40 lb. of sodium acid pyrophosphate, 0.20 lb. of anhydrous monocalcium phosphate, and 0.10 lb. of vanilla flavor were added and thoroughly mixed in a ribbon blender.

From the final mix three cakes were baked according to the following recipes, two whole eggs being added in the preparation of each cake.

| Cake No. | Amount of Mix, oz. | Amount of Water Added | Mixing Procedure | Baking Temperature, °F. |
|---|---|---|---|---|
| 1 | 19 | 1¼ c.+60 ml. | Blend 1 min. and beat 1 min. | 375 |
| 2 | 19 | 1¼ c. | Blend 1 min. and beat 2 mins. | 350 |
| 3 | 19 | 1¼ c.−60 ml. | Blend 1 min. and beat 3 mins. | 325 |

These cakes were compared to three cakes baked from a mix containing the same ingredients but produced by dry blending in accordance with conventional techniques. These latter cakes were prepared in accordance with the recipes for cakes 1 through 3 above, but in each case 21.25 oz. of mix were used rather than 19 oz. The volumes of all cakes were measured and the results are set forth in the table below:

| Cake No. | Volume of Cakes Made in Accordance With the Invention | Volume of Cakes Baked From Conventional Cake Mix |
|---|---|---|
| 1 | 89 | 91 |
| 2 | 98 | 91 |
| 3 | 90 | 91 |

From the above it may be seen that the cakes produced in accordance with the invention compare favorably in volume with those produced by conventional mix manufacturing techniques. However, it should be noted that the cakes made in accordance with the present invention contained only 19 oz. of mix whereas the cakes of the prior art were made from 21.25 oz. of mix.

I. The above parts by weight of emulsified shortening and sucrose for each 100 parts by weight of premix flour are based upon the following calculations:

A. Parts by weight premix sucrose for each 100 parts by weight premix flour:

$$\frac{47.5 \text{ lbs. sucrose}}{103 \text{ lbs. flour}} \times 100 \text{ parts by weight} =$$

46.116 parts weight premix sucrose for each 100 parts of premix flour

B. Parts by weight emulsified shortening for each 100 parts by weight premix flour:

(1) Total emulsified shortening premix weight is as follows:

| Ingredient: | Pounds |
|---|---|
| Lard | 21.52 |
| Alpha monoglyceride | 3.19 |
| Propylene glycol monoester | 0.99 |
| Sorbitan monostearate | 0.93 |
| Polyoxyethylene sorbitan monostearate | 1.12 |
| Total | 27.75 |

(2) Parts by weight emulsified shortening:

$$\frac{27.75 \text{ lbs. emulsified shortening}}{103 \text{ lbs. flour}} \times 100 \text{ parts by weight flour} = 26.94 \text{ parts by weight of premix emulsified shortening for each 100 parts by weight premix floor}$$

II. The amount of crystalline sucrose added to the premix based upon 100 parts by weight premix flour is derived from the following calculations:

A. Amount of premix flour employed in making the final cake mix: Since 178.25 lbs. of ingredients were initially employed in providing the spray-dried premix and only 69.25 lbs. of the resultant spray-dried premix thereof was employed, the actual weight of the premix flour is derived as follows:

$$\frac{69.25 \text{ lbs. premix ingredient}}{178.25 \text{ lbs. ingredients}} \times 103 \text{ lbs. flour} = 36.387 \text{ lbs. premix flour}$$

B. Amount of added crystalline sucrose for each 100 parts by weight premix flour:

$$\frac{24.69 \text{ lbs. added crystalline sucrose}}{36.387 \text{ lbs. premix flour}} \times 100 \text{ parts by weight} = 67.855 \text{ parts by weight added crystalline sugar for each 100 parts by weight premix flour}$$

Example XII.—Mixing time comparison

A series of cakes were baked utilizing the final mix described in Example I. Each cake was baked from 17.5 oz. of dry mix in accordance with a recipe which called for the addition of two whole eggs and 1¼ c. water and a mixing procedure of one minute blending at low speed and followed by one minute of high speed mixing. Cakes produced in this manner showed a volume of 92 pints on the arbitrary scale previously mentioned. A series of cakes were also baked utilizing 17.5 oz. of conventional dry-blended mix using the same recipe including the one minute blending and one minute mixing procedure. The average volume of these cakes was 78 points on the arbitrary scale.

Example XIII.—Preparation of pancake mix 45 lbs. of flour, 2.0 lbs. dextrose, 1.25 lbs. salt, and 65 lbs. of water are thoroughly mixed at a temperature of 100° F. and spray-dried as in the previous examples. A free-flowing, dry premix is recovered to which 1.0 lb. of sodium bicarbonate and 1.0 lb. anhydrous monocalcium phosphate are added to form a final pancake mix.

Example XIV.—Preparation of hot roll mix 43 lbs. of flour, 3.5 lbs. of lard, 2.25 lbs. sucrose, 0.63 lb. whey and 0.63 lb. salt are thoroughly mixed with 65 lbs. water at a temperature of 90° F. and then spray-dried as in the previous examples. A dry, free-flowing hot roll mix is recovered.

Although the invention has been illustrated herein primarily by reference to cake mixes, it will be understood that it has much broader applicability. In addition to cake mixes, the farinaceous compositions to which the present invention is applicable include biscuit mixes, pancake mixes, bread and roll mixes, and mixes designed for production of sweet dough goods. In general terms, these products all contain flour and at least one component selected from the group of ingredients consisting of shortening and sugar. For this reason it is intended that the invention be limited only by the appended claims.

What is claimed is:

1. A method of making a cake mix comprising the steps:

(a) providing an edible composition consisting essentially from 30 to 70 percent by weight flour, from 10 to 70 percent by weight sugar and from 4 to 26 percent by weight emulsified shortening, said composition containing less than 100 parts by weight sugar for each 100 parts by weight flour;

(b) incorporating therein a non-toxic, aqueous liquid containing a sufficient amount of water to provide a solid-to-water ratio ranging from at least 1:3 to less than 13:7;

(c) mixing said non-toxic, aqueous liquid and said edible composition to homogeneously disperse said flour, sugar and shortening in said aqueous medium while maintaining the temperature within the range of 80° F. to 140° F. thus providing a visco-elastic mass;

(d) drying the visco-elastic mass to form a dry, free-flowing premix composition comprising a multiplicity of small, discrete particles each of which comprises a cluster of flour-starch particles carried by a matrix composing a flour-protein and amorphous sugar; and (e) dry blending the premix composition resulting from step (d) with additional ingredients not used in forming the premix composition to provide a cake mix that contains from 4 to 26 percent by weight shortening, said additional ingredients based upon 100 parts by weight flour in said premix composition containing crystalline sucrose in an amountt ranging from about 48 to about 210 parts by weight.

2. The method according to claim 1 wherein the drying is accomplished by spray drying.

3. The method according to claim 2 wherein from about 48 to about 70 parts by weight sucrose is dry blended.

4. The method according to claim 3 wherein chemical leavening is added in the dry blending step.

5. The method according to claim 4 wherein the visco-elastic mass contains 100 parts by weight flour, from about 8 to about 75 parts by weight shortening and from about 46 to about 57 parts by weight sugar.

6. The method according to claim 4 wherein the visco-elastic mass contains less than about 53 parts by weight sucrose.

7. A chemically leavened cake mix adapted to readily disperse in an aqueous medium and containing flour, sugar and from 4 to 26 weight percent shortening wherein said shortening weight percent is based upon the total weight of sugar, flour and shortening contained in said cake mix, said cake mix comprising a mixture of a premix portion and a mix portion substantially free from flour, said premix portion comprising a multiplicity of small, discrete particles each containing from 30 to 70 percent by weght flour, from 10 to 70 percent by weight sugar and from 4 to 26 percent by weight emulsified shortening with each of said particles consisting essentially of a cluster of substantially ungelatinized flour-starch particles carried by a matrix comprising flour-protein and amorphous sugar with the shortening being present within said particles as globules, said premix particles beng further characterized as containing less than about 57 parts by weight amorphous sugar for each 100 parts by weight flour contained therein and said mix portion containing crystalline sucrose in an amount from about 48 to about 210 parts by weight sucrose for each 100 parts by weight flour contained in said premix.

8. The cake mix according to claim 7 wherein the premix portion consists essentially of spray-dried particulates.

9. The cake mix according to claim 8 wherein the mix portion contains from about 48 to about 70 parts by weight sucrose.

10. The cake mix according to claim 9 wherein the mix portion contains from about 48 to about 70 parts by weight crystalline sucrose for each 100 parts by weight flour contained in the premix portion and the amount of amorphous sugar provided in the premix portion is less than about 53 parts by weight.

11. The cake mix according to claim 9 wherein the mix portion contains chemical leavening.

12. The cake mix according to claim 11 wherein the premix contains 100 parts by weight flour, from about 8 to about 75 parts by weight shortening and from about 46 to about 57 parts by weight amorphous sugar.

References Cited

UNITED STATES PATENTS

| | | | |
|---|---|---|---|
| 1,959,466 | 5/1924 | Duff et al. | 99—94 |
| 2,471,435 | 5/1949 | Kimball et al. | 99—144 |
| 2,893,871 | 7/1959 | Griffin | 99—56 |
| 3,116,150 | 12/1963 | Baker | 99—94 |
| 3,236,654 | 2/1966 | Lipka | 99—94 |
| 3,251,695 | 5/1966 | Gidlow et al. | 99—94 |
| 3,257,213 | 6/1966 | Colby | 99—94 |

FOREIGN PATENTS 622,017   6/1961   Canada.

RAYMOND N. JONES, *Primary Examiner.*